INVENTOR
JOHN P. MARKWICK
BY
Whittemore, Hulbert & Belknap
ATTORNEYS

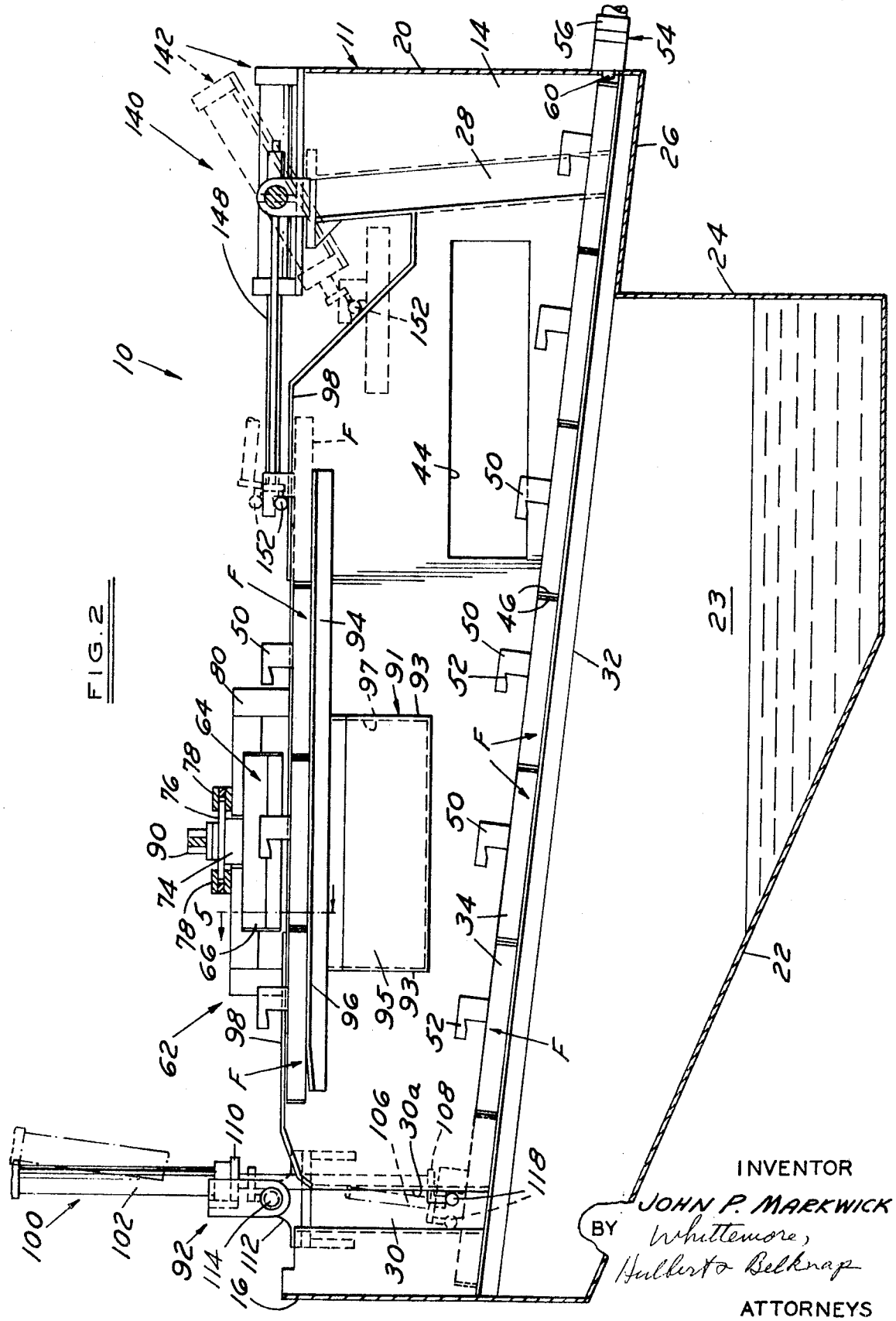

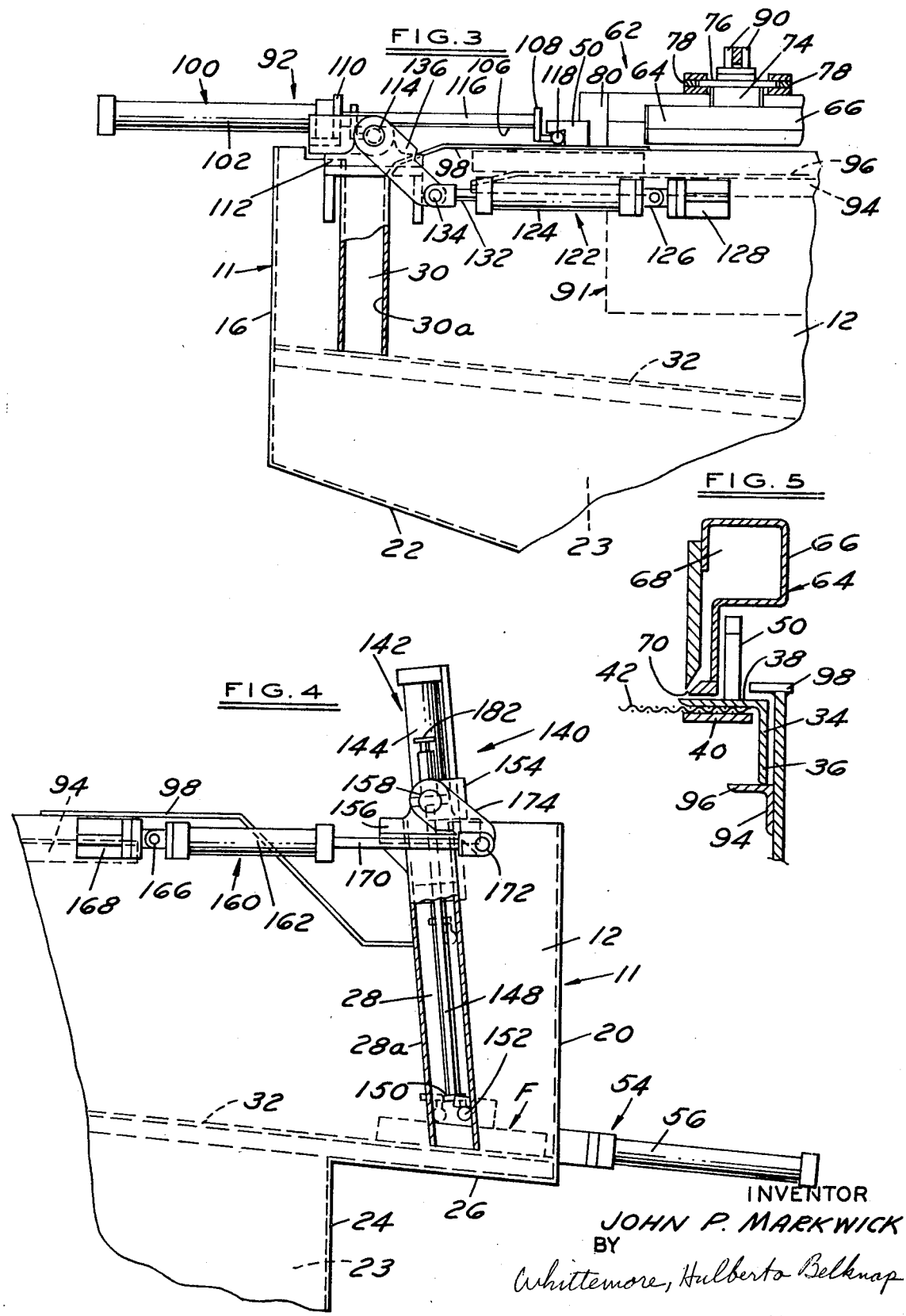

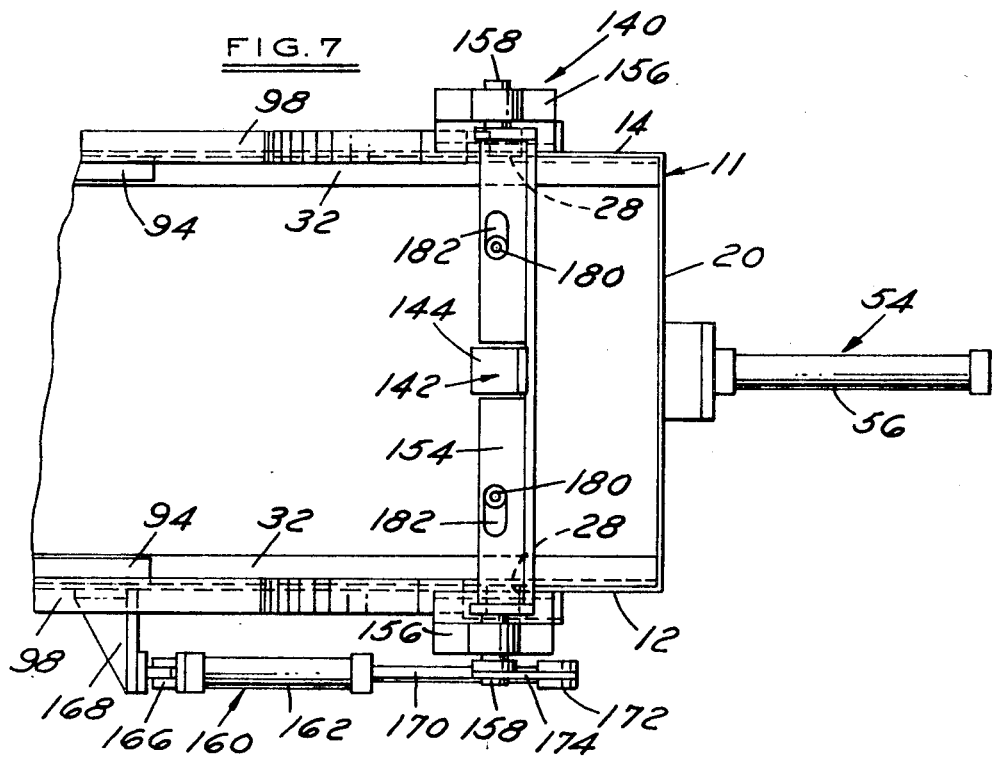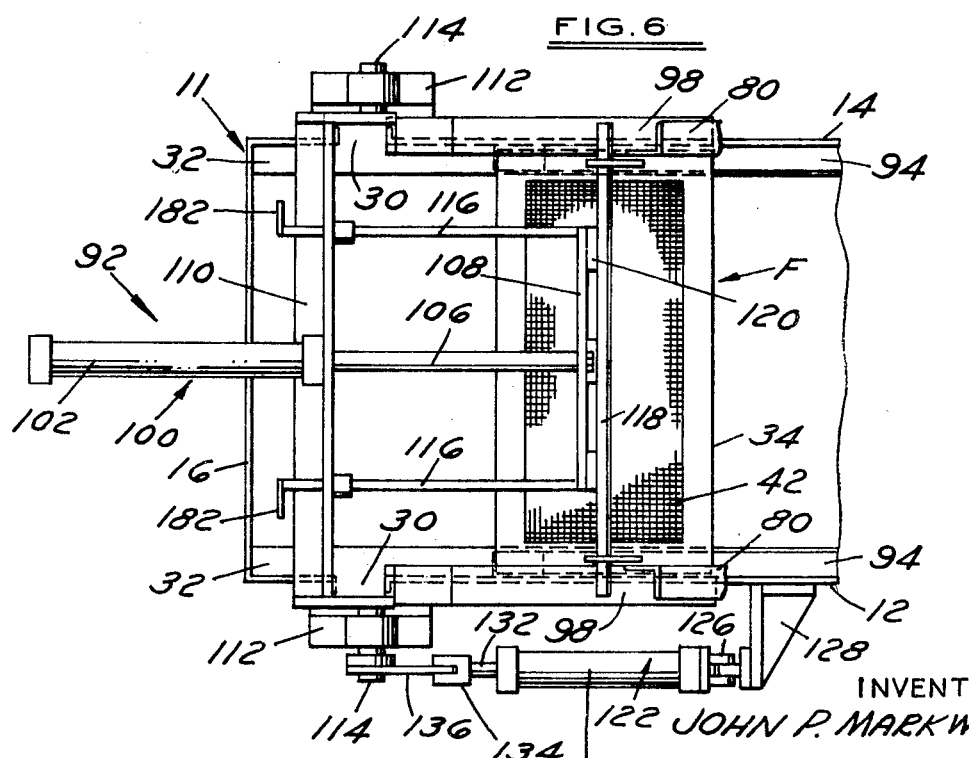

INVENTOR
JOHN P. MARKWICK

`United States Patent Office`

3,513,974
Patented May 26, 1970

3,513,974
INDEXING FILTER SCREENING APPARATUS AND METHOD
John P. Markwick, Clawson, Mich., assignor to C. A. Dauer Company, Inc., Detroit, Mich., a corporation of Michigan
Filed Oct. 31, 1967, Ser. No. 679,397
Int. Cl. B01d 33/32
U.S. Cl. 210—73
14 Claims

ABSTRACT OF THE DISCLOSURE

The apparatus comprises a row of individual, separate filter screen units which can be intermittently moved along a base and then cleaned and returned for filtering. Specifically, when the surface of the unfiltered liquid above the filter screen units rises to a predetermined level, a transfer mechanism moves a filter screen unit at one end of the row to a cleaning station, and a second transfer mechanism returns a cleaned filter screen unit from the cleaning station to the opposite end of the row.

BACKGROUND OF THE INVENTION

Prior filtering apparatuses, instead of having individual, separate filter screen units, have employed an endless strip of filtering material movable in a circuit through a filtering tank and a cleaning station. According to the present invention the filter medium is composed of separate filter screen units which maye be individually removed, cleaned and returned for filtering or, when worn out, may be individually removed and replaced.

SUMMARY OF THE INVENTION

The invention relates to filter screening apparatus comprising a plurality of separate filter screen units which are supported in positions to filter a fluid medium, the filtering screen units being individually removable and replaceable.

One object of the invention is to provide means for removing individual filter screen units and replacing the same.

Another object is to provide means for supporting the filter screen units in a row to filter a fluid medium, and including a device for removing filter units from one end of the row and a device for returning filter units to the opposite end of the row.

Another object is to provide means for moving individual filter screen units intermittently and successively along a base where they filter the fluid medium, and for removing and cleaning individual filter screen units and then returning them to the base for further use.

Another object of the invention is to provide improved transfer mechanism for removing and replacing the individual filter screen units.

Another object is to provide improved filter screening units capable of being readily transferred to and from a cleaning station.

Another object is to provide an improved cleaning station for the filter screen units.

Another object is to provide an improved method of filtering a fluid medium.

Other objects and features of the invention will become apparent as the description proceeds, especially when taken in conjunction with the accompanying drawings, wherein:

FIG. 2 is a vertical sectional view taken lengthwise through the apparatus.

FIG. 3 is a fragmentary side elevational view of one end of the apparatus, showing certain parts positioned differently than in FIG. 2.

FIG. 4 is a fragmentary side elevation of the other end of the apparatus, showing certain parts positioned differently than in FIG. 2.

FIG. 5 is a fragmentary sectional view taken on the line 5—5 of FIG. 2.

FIG. 6 is a fragmentary top plan view of the structure shown in FIG. 3.

FIG. 7 is a fragmentary top plan view of the structure shown in FIG. 4.

Figure 1:
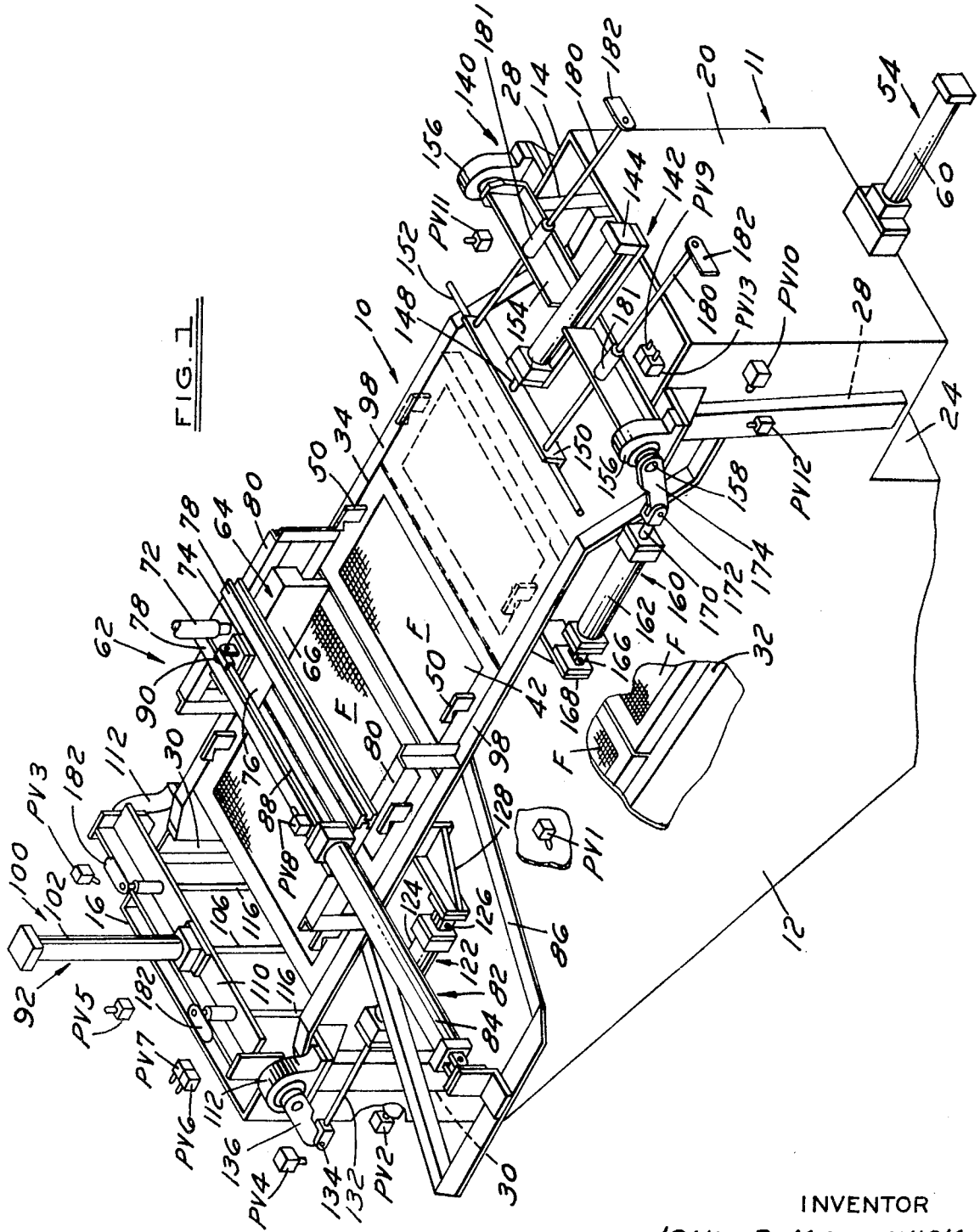
FIG. 1 is a perspective view of apparatus embodying my invention, with limit switches shown diagrammatically.

Referring now more particularly to the drawings, the apparatus is generally designated by the reference character 10 and includes an elongated rectangular tank 11 into which liquid is delivered to be filtered. Preferably, as shown, the tank 11 has elongated upright side walls 12 and 14 and upright end walls 16 and 20. The bottom 22 of the tank provides a closed receptacle 23 for filtered liquid. The front vertical wall 24 of the receptacle 23 is spaced from the front wall 20, being connected thereto by an inclined wall 26 which extends between the side walls 12 and 14.

The side walls 12 and 14 are preferably substantially parallel and near their forward ends are shaped to provide the generally vertical, opposed outwardly deformed portions providing cam tracks 28. The cam tracks 28 are straight and preferably inclined upwardly in a rearward direction, as shown in FIG. 2, and are open at the top. The side walls 12 and 14 are shaped near their rear ends with the substantially vertical, opposed outwardly deformed portions which provide cam tracks 30, also straight and open at their upper ends.

Angle guide rails 32 are secured to the inner surfaces of the side walls 12 and 14 and extend for the full length of the apparatus, as shown in FIG. 2. These guide rails are inclined at substantially the same angle as the wall 26 of the tank. The guide rails 32 have inwardly extending flanges which are directly opposite one another to provide a support for the filter units F.

FIG. 2 illustrates a plurality of filter units F supported upon the guide rails 32. These filter units are each composed of an elongated rectangular border frame 34, shown in FIG. 5 as having a vertical flange 36 and an inwardly directed horizontal flange 38. A flat rectangular frame 40 secured to the underside of the horizontal flange 38 grips and secures a screen 42 to the undersurface of flange 38. The screen 42 extends across and closes the space within the border frame 34.

In operation, the unfiltered liquid is introduced to the tank through an opening 44 in the side wall 14 and filters through the filter units F supported on guide rails 32 and collects in the receptacle 23 where it may be withdrawn for further use.

As shown in FIGS. 1 and 2, the filter units F extend transversely across the space between the side walls 12 and 14, having their opposite ends supported upon the guide rails 32. The filter units F extend for substantially the full width of the tank between side walls 12 and 14 to prevent the unfiltered liquid from bypassing the filter units. Also, the filter units have strips 46 of rubber or like material along the outer sides of flanges 36 which contact one another, as shown in FIG. 2, to prevent unfiltered liquid from seeping downward between the filter units. The liquid passes downward through the screens of the filter units 42 which removes solids and undesirable material. A pool of unfiltered liquid may develop on the filter units F, the surface of which may gradually build up and approach the rear wall 16 of the tank as the screens 42 collect and become partially clogged with the filtered out material.

FIG. 2 shows a filter unit F in dotted lines at the left or rear end of the guide rails 32 in the tank, but it will be understood that during a normal filtering operation this space will not be occupied by a filter unit. However, as will become apparent hereinafter, in the event that the unfiltered liquid above the filter units F builds up to a predetermined level, certain apparatus is automatically operated to advance the row of filter units F on guide rails 32 to the left so that the rearmost filter unit will assume the dotted line position in FIG. 2, where it is picked up and transferred to a cleaning station.

To complete the description of the filter units F, it is noted that each has a bracket 50 at each end which is generally upright and of inverted L-shape, as shown in FIG. 2. The angle formed by the two legs of the L is slightly undercut, as shown at 52, in order to permit a lifting bar to be inserted under the brackets to lift the filter unit. The brackets of each filter unit are parallel to the ends thereof and lie directly opposite one another, as clearly shown in FIG. 1.

In order to advance the row of filter units F along the angle guides 32 in a rearward direction, or to the left in FIG. 2, a piston-cylinder assembly 54 is provided having a cylinder 56 secured to the front wall 14 of the tank on the outer side thereof. The piston 58 within the cylinder has a rod 60 extending through the front wall 14 of the tank and engageable with the forwardmost filter unit F of the row so that when the rod 60 is extended the row of filter units is advanced to the left a distance equal to substantially the width of one filter unit.

There is a filter unit cleaning station 62 above the row of filter units F on guide rails 32. At the cleaning station there is a reciprocable blow-off device 64 which is in the form of an elongated hollow member disposed lengthwise of the tank and reciprocable widthwise of the tank. The hollow member is designated 66 and has an elongated chamber 68. Along its lower edge the member 66 has a narrow outlet 70 which extends for the full length of the member and through which air or other fluid under pressure is discharged from chamber 68 horizontally across the horizontal screen face of a filter unit F at the cleaning station to remove the collected impurities. Air under pressure is delivered to the chamber 68 through conduit 72.

Blow-off device 64 is carried by a head 74 which has a plate 76, the opposite edges of which are guided in grooves of the guide members 78 extending across the tank. The opposite ends of guide members 78 are mounted on supports 80 on the tops of side walls 12 and 14. The guide members 78 guide the head 74 and hence the blow-off device 64, across substantially the full width of the tank.

A piston-cylinder assembly 82 reciprocates blow-off device 64 and comprises a cylinder 84 mounted on one of the supports 80 and on bracing 86. A rod 88 extends from the piston 86 and is pivoted to brackets 90 mounted on the top of head 74. Movement of piston 86 reciprocates the blow-off device the width of the tank to blow off material collected on the surface of the screen 42 of a filter unit F.

A drain pan 91 in the tank beneath the cleaning station 62 has sides 93 and in bottom 95. The pan is secured to wall 14 and extends across the width of the tank. The bottom 95 is slanted downward toward wall 14. Drippings from a filter unit F at the cleaning station will not fall into the liquid in the tank but will be caught by the pan and discharged through the outlet 97 in wall 14.

A transfer mechanism 92 on the rear end of the apparatus transfers a filter unit from the dotted line position on guide rails 32 to the cleaning station 62. In this connection it will be noted that the cleaning station includes guide rails 94 secured to the inner surfaces of the side walls 12 and 14 of the tank in opposed relation to one another and above the row of filter units on guide rails 32. The rails 94 are horizontal angle members opposed to one another having the horizontal flanges 96 extending inward toward one another to support the opposite ends of filter screen units at the cleaning station 62, as shown in FIGS. 1 and 2. Along the top edges of the side walls 12 and 14 there are inwardly directed flanges 98 which are adapted to overlie filter screen units F supported on rails 94. The filter screen units F at the cleaning station are advanced progressively from left to right in FIG. 2, as will appear more fully hereinafter.

The transfer mechanism 92 includes a piston-cylinder assembly 100 which has a cylinder 102 and a piston 104 in the cylinder. A piston rod 106 extending from the piston 104 has its free end connected to a transverse member 108. The cylinder 102 is mounted on a transverse support member 110, the opposite ends of which are pivoted in pillow blocks 112 by aligned, horizontal pivot shafts 114. Guide rods 116 are secured to the cross member 108 and slidably guided in the support 110. A horizontal lifting bar 118 is secured to the transverse member 108 by blocks 120. The lifting bar 118 is of a width greater than the distance between the side walls 12 and 14 so as to extend within the cam tracks 30 when cylinder 102 is substantially upright and the piston thereof extended.

The piston-cylinder assembly 100 is pivoted about the axis of pivot shafts 114 by a piston-cylinder assembly 122 which includes a cylinder 124 pivoted at 126 to a bracket 128 on the side wall 12 of the tank. The cylinder 124 has a piston 130 therein and a rod 132 extending from the piston is pivoted at 134 to a crank 136 secured to and extending from one of the pivot shafts 114. When the piston rod 132 is extended, as in FIG. 1, the piston-cylinder assembly 100 is substantially upright, and when the piston rod 132 is retracted the piston-cylinder assembly 100 is substantially horizontal, as in FIG. 3.

At the front end of the machine there is a transfer mechanism for returning filter units from the cleaning station to the guide rails 32. Transfer mechanism 140 includes a piston-cylinder assembly 142 which has a cylinder 144 and a piston 146 in the cylinder. The end of the piston rod 148 carries a horizontal angle member 150, and a horizontal lifting bar 152 is carried by the angle member. The cylinder 142 is secured to a transverse support 154. The opposite ends of the support are journaled for rotation in pillow blocks 156 by aligned, horizontal pivot shafts 158 so that the piston-cylinder assembly 142 can be pivoted from the substantially upright position of FIG. 4 to the substantially horizontal position of FIG. 2. The length of the lifing bar 152 is greater than the distance between the side walls 12 and 14 of the tank so that the ends of the lifting bar will extend into and be guided by the cam tracks 28 when the cylinder assembly 142 is substantially upright, as in FIG. 4, and the rod 148 is extended.

The piston-cylinder assembly 142 is rotated by a piston-cylinder assembly 160, which includes a cylinder 162 having a piston 164 therein. The cylinder 162 is pivoted at 166 to a bracket 168 mounted on the side wall 12 of the tank, and the free end of the rod 170 extending from the piston 164 is pivoted at 172 to a crank arm 174 secured to and projecting from one of the pivot shafts 158. When the piston rod 170 is extended the piston-cylinder assembly 142 is substantially upright, as in FIG. 4, and when the rod 170 is retracted the assembly 142 is substantially horizontal, as in FIG. 1.

It will be noted that guide rods 180 secured to the angle member 150 are guided in bushings 181 carried by the support 154.

The upper ends of the guide rods 116 and 180 carry switch operating members 182 for operating certain of the control switches.

In the operation of the filtering apparatus and assuming the pool of unfiltered liquid upon the filter units F supported in a row on rails 32 has not reached the critical level, the position of the various parts of the apparatus are as follows:

(a) The piston-cylinder 100 assumes the vertical solid line position of FIG. 2 in which the piston rod 106 is extended and the ends of the lifting bar 118 are disposed in the cam tracks 30 in engagement with the forward wall 30a thereof. There will not at this time be a filter unit F disposed in the dotted line position on guide rails 32 at the extreme left in FIG. 2.

(b) Piston-cylinder assembly 133 will have fluid under pressure directed to it in a direction tending to retract the rod 132 and swing assembly 100 to a substantially horizontal position, but such swinging movement is prevented by the engagement of the ends of lifting bar 118 with the forward walls 30a of the cam tracks 30.

(c) Piston-cylinder assembly 142 is retracted, as shown in FIG. 1, and piston-cylinder assembly 160 is also retracted so that assembly 142 is substantially horizontal.

(d) The piston-cylinder assembly 54 is retracted, as shown in FIG. 2, and piston-cylinder assembly 82 is extended, as shown in FIG. 1.

(e) Filter screen units F which have been transferred to the cleaning station, will be supported on rails 94, although it will be understood that at this time there will be no filter screen unit in the position indicated at dotted lines to the right in FIGS. 1 and 2.

Figure 8:
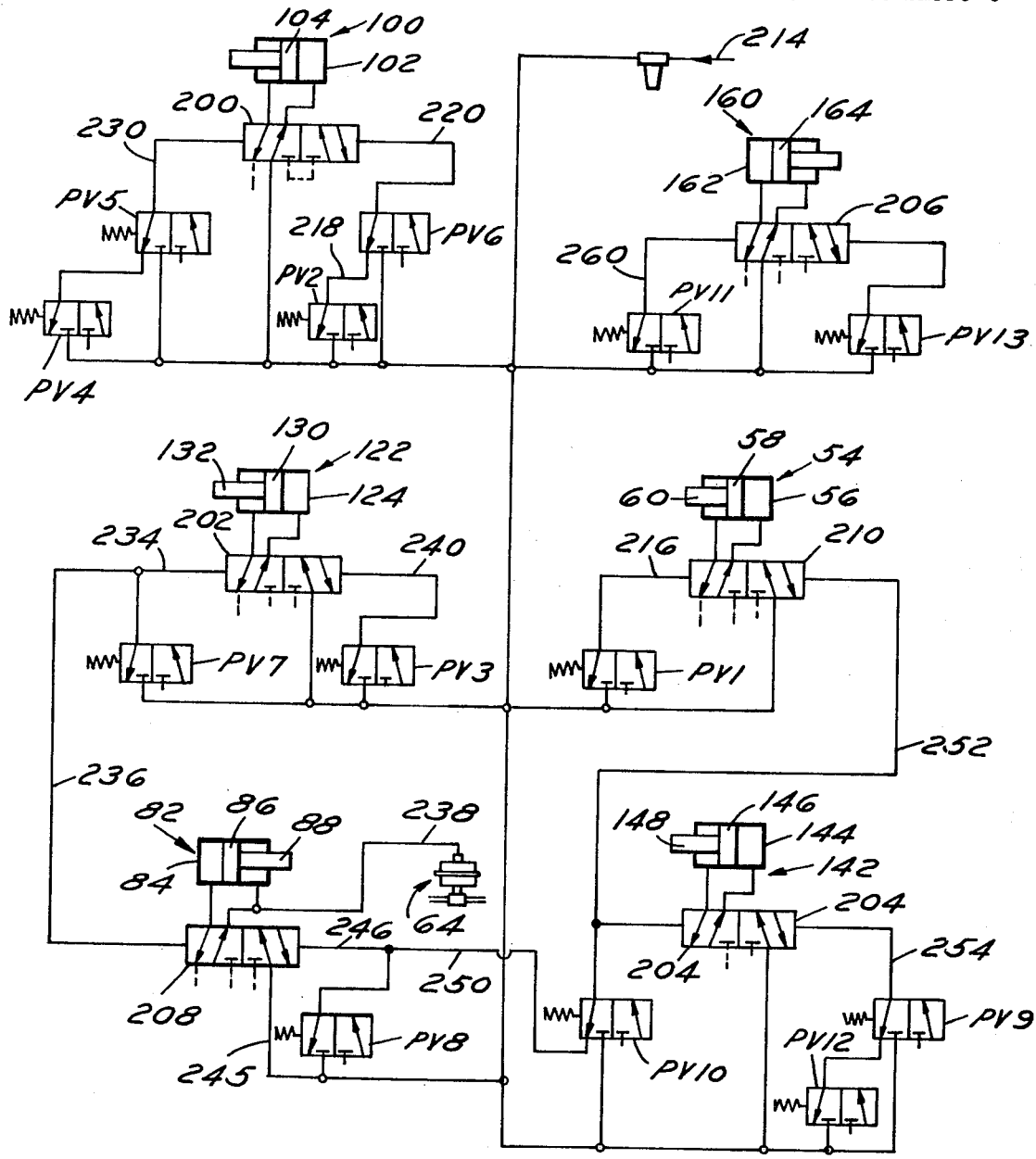
FIG. 8 is a schematic air diagram.

The various piston-cylinder assemblies are operated by air, but any fluid medium may be employed. The air diagram is shown in FIG. 8 and it will be noted that there is a valve for each of the piston-cylinder assemblies which in one position directs air under pressure to the head end of the assembly while exhausting the rod end, and in the other position directs air under pressure to the rod end of the assembly and exhausts the head end. Thus, the assembly 100 has a valve 200, the assembly 122 has a valve 202, the assembly 142 has a valve 204, the assembly 160 has a valve 206, the assembly 82 has a valve 208, and the assembly 54 has a valve 210. The valves are shown in their normal positions to which they return as by spring pressure after they have been actuated. Air under pressure is admitted to the air circuit from a suitable source of pressure at the point 214 in the line.

Briefly, the operation of the apparatus is as follows:

When the water above the row of screen units F on rails 32 rises to a predetermined level, float switch PV1 is operated to advance the row of filter screen units F to the left in FIG. 2 a distance equal to approximately the width of one filter screen unit. The rearmost filter screen unit F is advanced to the dotted line position in FIG. 2 where it is picked up by the transfer mechanism 92 and deposited on the rear end of rails 94 at the cleaning station 62. The deposit of the filter screen unit F on rails 94 at the cleaning station pushes ahead the filter screen units previously deposited there a distance equal to the width of one filter screen unit so that the leftmost filter screen unit on rails 94, shown in FIG. 2, is advanced into register with the blow-off device 64. The rightmost filter screen unit on rails 94 is simultaneously advanced to the dotted line position there illustrated. The blow-off device 64 is operated to sweep across the registering filter screen unit and blow off accumulated particles on the screen 42 thereof. The filter screen unit shown in dotted lines at the right of rails 94 is returned by the transfer mechanism 140 to rails 32 at the right-hand end of the row to complete the cycle. The apparatus will recycle when the unfiltered liquid above the filter screen units F on rails 32 builds up again to the level of the switch PV1 so as to replace clogged filter screen units with ones that have been cleaned.

The following is a detailed description of the operation:

The pneumatic system will remain at rest until a sufficient quantity of particles have been collected on the filter screen units F supported on rails 32 to cause the water above the screen units to rise to a preset level and operate the float switch PV1. When switch PV1 is operated, air under pressure is directed through line 216 to shift valve 210 from the position shown and direct air under pressure to the head end of cylinder 56, thereby extending its piston rod 60 and advancing the row of filter screen units F on guide rails 32 a distance equal approximately to the width of one of the filter units so as to dispose the rearmost filter unit F in the dotted line or unload position at the left in FIG. 2. This rearmost filter unit in the unload position will then engage and actuate the switch PV2 which causes air to be admitted to lines 218 and 220 to shift valve 200 and admit air under presusre to the rod end of cylinder 102 and retract the same. As noted in FIG. 2, the brackets 50 on the screen unit F now in the unload position are engaged over the pick-up bar 118 of the piston-cylinder assembly 100 so that upon retraction thereof the screen unit is raised to approximately the level of the guide rails 94 at the cleaning station.

It will be remembered that in the at-rest position of the pneumatic system, air under pressure was directed to the rod end of piston-cylinder assembly 122, but that retraction of this assembly was prevented by the engagement of the opposite ends of the pick-up bar 118 in the cam track 30. However, piston-cylinder assembly 100 now having been retracted, assembly 122 is permitted to assume its retracted position with the result that the assembly 100 is turned to its substantially horizontal position. In this position, one of the guide rods 116 of assembly 100 engages and actuates switch PV5. As a result, air under pressure is directed through line 230 to shift valve 200 back to the position shown in FIG. 8 in which air under pressure is directed to the head end of piston-cylinder assembly 100 to extend the latter, as shown in FIG. 3, and deposit the unloaded screen unit upon the guide rails 94 at the cleaning station 62. This causes the previously unloaded screen unit to be pushed ahead into cleaning position with respect to the blow-off device 64. The forwardmost filter screen unit at the cleaning station which has been cleaned is advanced to the position shown in dotted lines in FIG. 2 ready to be loaded back to filtering position on rails 32 by the transfer mechanism 140.

When piston-cylinder assembly 100 extends to the FIG. 3 position, the switch actuating member 182 on one of its guide rods 116 engages and actuates switches PV6 and PV7 simultaneously. Actuation of switch PV6 directs air under pressure through line 220, shifting valve 200 and admitting air under presure to the rod end of piston-cylinder assembly 100 to retract the same. Actuation of switch PV7 directs air under pressure through line 234 to shift valve 202 and cause air under pressure to be directed to the head end of piston-cylinder assembly 122 extending the same and thereby rotating the assembly 100 to its substantially upright position. Actuation of switch PV7 also directs air under pressure through line 236 to shift valve 208 and direct air under pressure to the rod end of piston-cylinder assembly 82, retracting the latter and causing the blow-off device 64 to make a stroke across the width of the filter screen unit F which is in position to be cleaned at the cleaning station. Valve 208 also directs air under pressure through line 238 to the blow-off device 64. The air will be discharged from outlet 70 of the blow-off device and will blow collected particles from the screen 42 of the filter unit F at the cleaning station as the blow-off device 64 sweeps across.

Wih piston-cylinder assembly 100 rotated to a vertical position as a result of the extension of piston-cylinder assembly 122, switch PV4 is actuated by the crank arm 136 and the actuation of switch PV4 serves to deliver air under pressure to shift valve 200 and cause air under pressure to be delivered to the head end of piston-cylinder assembly 100 extending the latter. With assembly 100 in a substantially vertical position and extended, one of the switch actuators 182 on a guide rod 116 actuates switch PV3 the result of which is to direct air through line 240 to shift valve 202 and direct air under pressure to the rod end of assembly 122. Assembly 122 will retract partially, but will be restrained from completing its retraction stroke due to the presence of the cam tracks 30. Referring to FIG. 2, the pick-up bar 118 has its ends engaged with the forward walls 30a of the two cam tracks 30 preventing the retraction of the assembly 122 and holding the cylinder assembly 100 in the upright solid line position of FIG. 2 ready for the next transfer or unloading of a filter unit from guide rails 32 to the filter cleaning station 62.

As a result of the full retraction of piston-cylinder assembly 82 to operate the blow-off device 64, switch PV8 is actuated by head 74 to direct air under pressure through line 246 to shift valve 208 causing air to be fed through line 245 to the head end of assembly 82 causing the latter to extend. Simultaneously with the shifting of valve 208, the air to line 238 is shut off so that the blow-off device 64 does not operate on the return stroke.

The operation of switch PV8 also directs air through line 250 to the valve 204 of piston-cylinder assembly 142 shifting the latter to direct air under pressure to the head end of assembly 142 and extending it so that it assumes the extended substantially horizontal position shown in dotted lines in FIG. 2 above a cleaned filter screen unit F at the cleaning station ready to be transferred back to the guide rails 32 for further filtering. The operation of switch PV8 also causes air through line 252 to shift valve 210 and thereby direct air pressure to the rod end of cylinder 54 to retract the latter.

When piston-cylinder assembly 142 is horizontal and extended one of the switch actuators 182 on its guide rod 180 operates limit switches PV9 and PV13 simultaneously causing assembly 142 to retract and assembly 160 to extend. Switch PV9 directs air through line 254 to shift valve 204 and direct air under pressure to the rod end of cylinder assembly 142, and switch PV13 directs air to shift valve 206 and delivers air under pressure to the head end of assembly 160.

The simultaneous extension of assembly 142 and retraction of assembly 160 causes the lifting bar 152 of assembly 142 to engage under the brackets 50 on the cleaned filter screen unit F to be transferred (FIG. 2) and to remove the same from the cleaning station 62. FIG. 2 shows the filter screen unit being transferred to an intermediate position in dotted lines.

When the assembly 142 reaches a substantially vertical position, the crank arm 174 operates switch PV10 directing air to shift valve 204 so as to deliver air under pressure to the head end of assembly 142 to extend the same. Assembly 142 in a substantially vertical position and fully extended operates switch PV11 through one of its switch actuators 182. The operation of switch PV11 causes air through line 260 to shift valve 206 and effect a retraction of piston-cylinder assembly 160. However, assembly 160 cannot fully retract due to the engagement of the ends of the lifting bar 152 with the rear walls 28a of the cam tracks 28 (see FIG. 4). This slight rearward movement of the lifting bar 152 disengages the same from the brackets 50 however, so that the cleaned filter unit F has now been returned to the forward end of the row of filter units on guide rails 32 and released by the transfer mechanism.

When piston-cylinder assembly 160 retracts partially, its crank arm 174 operates switch PV12 directing air to shift valve 204 and thus deliver air under pressure to the rod end of piston-cylinder assembly 142 to retract the same. When cylinder assembly 142 is fully retracted to remove the lifting bar 152 from cam tracks 28, cylinder assembly 160 is free to fully retract and swing the assembly 142 to the horizontal starting position. The cycle is now complete.

Referring generally to the apparatus, the openings in the screens 42 of the screen units are small enough to filter out the unwanted solid material in the liquid. The filtered liquid in the receptacle 23 at the bottom of the tank may be recirculated by a pump and used again for any desired purpose such as the cleaning of manufactured parts, for example.

It will be noted that the cleaned filter units F are returned to the row of filter units on guide rails 32 at the low end of the guide rails where there is no significant fluid flow. It should also be noted that the float switch PV1 is located to start the transfer cycle before the level of unfiltered liquid rises above the rearmost filter screen unit, shown in solid lines at the left in FIG. 2. Accordingly, when the leftmost filter unit F is moved to the dotted line position in FIG. 2 in the unload position from which it is picked up by the transfer mechanism 92, such filter unit is above the level of unfiltered liquid.

It should be understood that a filter screen unit F which has become so clogged as to require it to be throwh away, may be removed by hand from the cleaning station and immediately replaced by a new filter screen unit. This is an advantage over filter apparatuses of the type having an endless filter screen which must be replaced in its entirety when portions of it become hopelessly clogged.

If desired, a sludge collection tank may be provided at the side of tank 11 to collect material discharged by the drain pan 91 through the outlet opening 95.

What I claim as my invention is:

1. Filter screening apparatus comprising a plurality of individual separate filter screen units, means for supporting said filter screen units in a row to filter a fluid medium, said filter screen units being individually removable and replaceable, means for removing individual filter screen units from said supporting means and replacing the same including a removing device adjacent one end of said row and a replacing device adjacent the opposite end of said row, said filter screen units having brackets by means of which they may be transferred, said removing device including a piston-cylinder assembly member and a piston member reciprocable within said cylinder member, means pivotally mounting one of said members, a lifting member on the other of said piston and cylinder members for engaging said brackets to individually lift said filter screen units from said supporting means, said replacing device including a piston-cylinder assembly having a cylinder member and a piston member reciprocable there-within, means pivotally mounting one of said last-mentioned piston and cylinder members, and a lifting member on the other of said last-mentioned piston and cylinder members for engaging said brackets to individually lower said filter screen units to said supporting means.

2. Filter screening apparatus comprising a plurality of individual separate filter screen units, means for supporting said filter screen units in a row to filter a fluid medium, said filter screen units being individually removable and replaceable, means for removing individual filter screen units from said supporting means and replacing the same, a filter screen unit cleaning station above said row having means for cleaning individual filter screen units, said removing and replacing means including a removing device adjacent one end of said row and a replacing device adjacent the opposite end of said row, said removing device being operative to transfer individual filter screen units from said supporting means to said cleaning station and said replacing device being operative to transfer individual filter screen units from said cleaning station to said supporting means, said filter screen units having brackets by means of which they may be lifted, said removing device including a piston-cylinder assembly having a cylinder member and a piston member reciprocable therewithin, means pivotally mounting one of said members, a lifting bar on the other of said piston and cylinder members for engaging said brackets to individually lift a filter screen unit from said one end of said row for transfer to said cleaning station, said replacing device including a piston-cylinder assembly having a cylinder member and a piston member reciprocable therewithin, means pivotally mounting one of said last-mentioned piston and cylinder members, a lifting bar on the other of said last-mentioned piston and cylinder members for engaging said brackets to individually remove a filter screen unit from said cleaning station for transfer to said opposite end of said row, and means for pivotally moving said pivotally mounted members of said piston-cylinder assemblies.

3. The filter screening apparatus defined in claim 2, including a receptacle for the fluid medium in which said filter screen units are disposed in spaced relation above the bottom of said receptacle, and means responsive to a predetermined rise in level of the unfiltered fluid medium above said row of filter screen units for actuating said removing and replacing devices.

4. The filter screening apparatus defined in claim 3, said cleaning station including means for supporting a filter screen unit to be cleaned, said cleaning means including a blower for directing a blast of air across the filter screen unit to be cleaned, and means responsive to the aforesaid predetermined rise in level of the unfiltered fluid medium for actuating said blower.

5. The filter screening apparatus defined in claim 4, including means for moving said blower across the surface of the filter screen unit to be cleaned during the time said blower is actuated.

6. Filter screening apparatus comprising a plurality of individual separate filter screen units, means providing a stationary support for supporting said filter screen units in a row to filter a fluid medium, said filter screen units being individually removable and replaceable, means for removing individual filter screen units from said support and replacing the same including a removing device adjacent one end of said row and a replacing device adjacent the opposite end of said row, said filter screen units having brackets, said removing device having a member engageable with said brackets to individually lift said filter screen units from said support, and said replacing device having a member engageable with said brackets to individually lower said filter screen units to said support.

7. Filter screening apparatus comprising a plurality of individual separate filter screen units, means providing a stationary support for supporting said filter screen units in a row to filter a fluid medium, said filter screen units being individually removable and replaceable, means for removing individual filter screen units from said support and replacing the same including a removing device adjacent one end of said row and a replacing device adjacent the opposite end of said row, said filter screen units having transfer portions, said removing device having a member engageable with said transfer portions to individually remove said filter screen units from said support, and said replacing device having a member engageable with said transfer portions to individually replace said filter screen units on said support.

8. Filter screening apparatus comprising a plurality of individual separate filter screen units, means providing a support for supporting said filter screen units in a row to filter a fluid medium, said filter screen units being movable along said support and being individually removable and replaceable, means for removing individual filter screen units and replacing the same including a removing device adjacent one end of said row and a replacing device adjacent the opposite end of said row, said removing device having means engageable with said filter screen units to individually transfer the same from said support, and said replacing device having means engageable with said filter screen units to individually transfer the same to said support.

9. The filter screening apparatus defined in claim 8, including a cleaning station having means for cleaning individual filter screen units, said removing device being operative to transfer filter screen units removed from said support to said cleaning station, said replacing device being operative to transfer filter screen units from said cleaning station to said support.

10. The filter screening apparatus defined in claim 9, wherein said cleaning station includes means for supporting a filter screen unit in position to be cleaned, said cleaning means includes a blower for directing a blast of fluid across the filter screen unit in position to be cleaned in a direction substantially parallel to the face of said filter screen unit.

11. The filter screening apparatus defined in claim 10, including means for moving said blower across the face of the filter screen unit to be cleaned.

12. The filter screening apparatus defined in claim 8, including a receptacle for the filtered fluid medium, and means responsive to a predetermined rise in level of the fluid medium in said receptacle for activating said removing and replacing devices.

13. The filter screening apparatus defined in claim 8, including means for moving said filter screen units along said support.

14. A method of filtering a fluid medium comprising supporting a plurality of individual separate generally upwardly facing filter units substantially edge to edge in a row, introducing a fluid medium to be filtered above the row of units for filtering therethrough, providing a filter unit removing device adjacent one end of the row, providing a filter unit replacing device adjacent the opposite end of the row, providing an advancing device adjacent said opposite end of the row for advancing the units toward said one end thereof, and periodically operating said advancing device to advance the row of units a distance corresponding to the length of one unit in a direction toward said one end of the row, operating said removing device to remove the unit at said one end of the row and operating said replacing device to replace another unit at said opposite end of the row.

References Cited

UNITED STATES PATENTS

| 2,081,009 | 5/1937 | Kelley | 210—236 X |
| 2,688,406 | 9/1954 | Holland | 210—328 X |
| 2,921,687 | 1/1960 | Jenkins | 210—341 |
| 3,075,646 | 1/1963 | Giesse | 210—391 |
| 3,225,928 | 12/1965 | Black | 210—121 |
| 3,303,635 | 2/1967 | Sheraill | 55—272 X |
| 3,391,786 | 7/1968 | Beattie | 210—332 X |

FOREIGN PATENTS 917,182   1/1963   Great Britain.

JOHN W. ADEE, Primary Examiner

U.S. Cl. X.R.

210—77, 79, 106, 122, 328, 332